United States Patent
Alahyari et al.

(10) Patent No.: US 12,308,719 B2
(45) Date of Patent: May 20, 2025

(54) MULTIPLE POTTING MATERIAL STRUCTURES

(71) Applicant: Hamilton Sundstrand Corporation, Charlotte, NC (US)

(72) Inventors: Abbas A. Alahyari, Glastonbury, CT (US); Jagadeesh K. Tangudu, South Windsor, CT (US); Andrzej Ernest Kuczek, Bristol, CT (US); Kimberly Rae Saviers, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 191 days.

(21) Appl. No.: 18/133,038

(22) Filed: Apr. 11, 2023

(65) Prior Publication Data
US 2024/0348119 A1 Oct. 17, 2024

(51) Int. Cl.
*H02K 1/12* (2006.01)
*H02K 3/32* (2006.01)
*H02K 15/10* (2006.01)

(52) U.S. Cl.
CPC ............... *H02K 3/32* (2013.01); *H02K 1/12* (2013.01); *H02K 15/105* (2013.01)

(58) Field of Classification Search
CPC .......... H02K 3/32; H02K 15/105; H02K 1/12; H02K 15/12
See application file for complete search history.

(56) References Cited

U.S. PATENT DOCUMENTS

| | | | | |
|---|---|---|---|---|
| 5,314,984 A * | 5/1994 | Markovitz | ............. | C08L 63/00 525/929 |
| 5,532,533 A * | 7/1996 | Mizutani | ............. | H02K 21/14 310/68 B |
| 7,696,667 B2 * | 4/2010 | Tatebe | ............. | H02K 3/522 310/216.109 |
| 10,483,820 B2 * | 11/2019 | Luo | ............. | H02K 15/12 |
| 11,095,172 B2 | 8/2021 | Moros | | |
| 2003/0001440 A1 * | 1/2003 | Bourqui | ............. | H02K 3/38 310/43 |
| 2014/0015349 A1 | 1/2014 | Chamberlin et al. | | |
| 2014/0028139 A1 | 1/2014 | Hamer et al. | | |
| 2015/0229175 A1 | 8/2015 | Miyashita et al. | | |
| 2020/0185995 A1 | 6/2020 | Sato et al. | | |

FOREIGN PATENT DOCUMENTS

| | | |
|---|---|---|
| WO | 2000051224 A1 | 8/2000 |
| WO | 2022098636 A1 | 5/2022 |

OTHER PUBLICATIONS

European Search Report dated Oct. 11, 2024 in connection with European Patent Application No. 24169308.4, 10 pages.

* cited by examiner

*Primary Examiner* — Leda T Pham

(57) ABSTRACT

A stator for an electrical machine can include a plurality of windings, each forming a coil and end connections. The stator can include a first potting material having a first viscosity and a first thermal conductivity. The first potting material can be disposed on each coil and fills gaps between each coil. The stator can include a second potting material different from the first potting material and having a second viscosity and a second thermal conductivity. The second viscosity can be higher than the first viscosity and the second thermal conductivity is higher than the first thermal conductivity. The second potting material can be disposed on each of the end connections to provide increased thermal conductivity from the end connections.

20 Claims, 2 Drawing Sheets

MULTIPLE POTTING MATERIAL STRUCTURES

STATEMENT OF GOVERNMENT RIGHTS

This invention was made with government support under contract no. DE-AR0001351 awarded by the Department of Energy. The government has certain rights in the invention.

FIELD

This disclosure relates to multiple potting material structures.

BACKGROUND

High-power-density aviation-class electric machines are generally thermally limited at high power ratings and their performance can be improved by mitigating thermal limitations. While the coil windings in these machines can be cooled effectively through direct contact with embedded cooling channels, the connecting wire ends and connections do not maintain effective contact with cooling surfaces and are thermally the limiting regions. Traditionally, coils and cooling channels are typically encased in a potting epoxy that binds and supports all components. The potting epoxy also fills any residual gaps between components to provide good thermal contact. As such, it must be thin enough (low viscosity) to flow into small gaps. However, thermal conductivity of low viscosity epoxy is not ideal.

Such conventional methods and systems have generally been considered satisfactory for their intended purpose. However, there is still a need in the art for improvements. The present disclosure provides a solution for this need.

SUMMARY

A stator for an electrical machine can include a plurality of windings, each forming a coil and end connections. The stator can include a first potting material having a first viscosity and a first thermal conductivity. The first potting material can be disposed on each coil and fills gaps between each coil. The stator can include a second potting material different from the first potting material and having a second viscosity and a second thermal conductivity. The second viscosity can be higher than the first viscosity and the second thermal conductivity is higher than the first thermal conductivity. The second potting material can be disposed on each of the end connections to provide increased thermal conductivity from the end connections.

In certain embodiments, the first potting material can be low viscosity epoxy. The second potting material can include epoxy and one or more of higher thermal conductivity particles or fibers. In certain embodiments, the higher thermal conductivity particles or fibers include glass. In certain embodiments, the higher thermal conductivity particles or fibers can include carbon.

In certain embodiments, the stator can include one or more cooling features formed by or embedded in the second potting material configured to remove heat from the second potting material and/or the end connections. The one or more cooling features can include a plurality of fins extending outwardly from the second potting material. For example, the plurality of fins can be formed circumferentially with a gap between each fin.

In accordance with at least one aspect of this disclosure, a structure can include a first portion including first gaps, a second portion having no gaps or second gaps larger than the first gaps, a first potting material (e.g., as disclosed herein, e.g., as described above) having a first viscosity and a first thermal conductivity. The first potting material can be disposed on the first portion and can fill the first gaps of the first portion. The structure can include a second potting material (e.g., as disclosed herein, e.g., as described above) different from the first potting material and having a second viscosity and a second thermal conductivity. The second viscosity can be higher than the first viscosity and the second thermal conductivity is higher than the first thermal conductivity. The second potting material can be disposed on the second portion to provide increased thermal conductivity to the second portion. In certain embodiments, the structure can be a stator, e.g., as disclosed herein, e.g., as described above. Other suitable structures are contemplated herein.

In accordance with at least one aspect of this disclosure, a method can include applying a first potting material (e.g., as disclosed herein, e.g., as described above) having a first viscosity and a first thermal conductivity. The first potting material can be disposed on the first portion and fills the first gaps of the first portion to windings of a stator to fill in gaps between coils. The method can also include applying a second potting material (e.g., as disclosed herein, e.g., as described above) to end connections of the windings. The second potting material can be different from the first potting material and has a second viscosity and a second thermal conductivity. The second viscosity can be higher than the first viscosity and the second thermal conductivity is higher than the first thermal conductivity. The second potting material can be disposed on the second portion to provide increased thermal conductivity to the second portion.

Applying the first potting material can be performed before applying the second potting material. The method can further include bonding the first potting material and the second potting material together. The method can include providing a transition between the first potting material and the second potting material to provide bonding between the first potting material and the second potting material.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
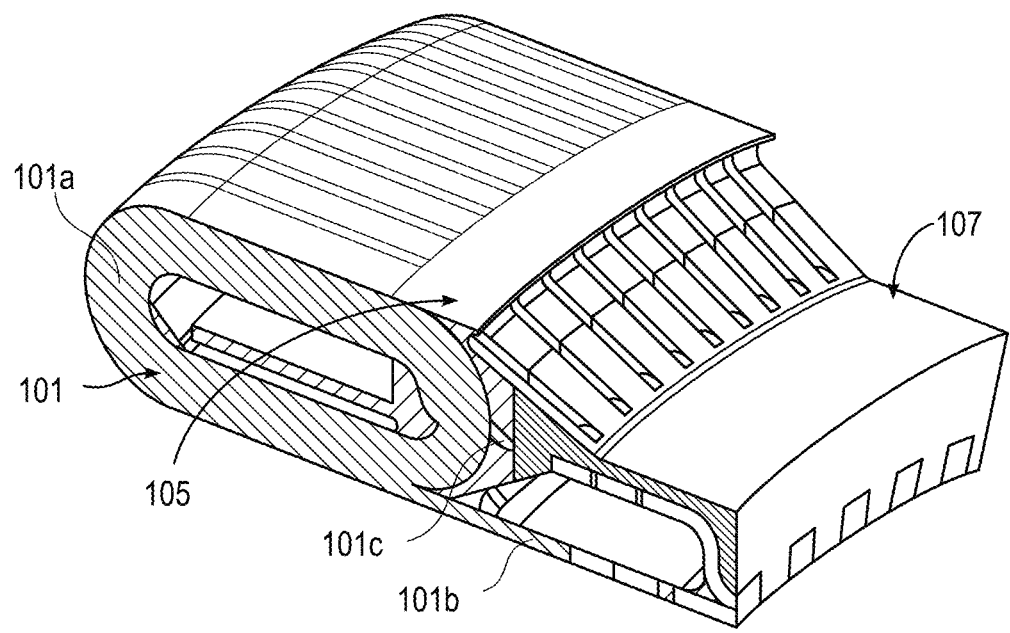
FIG. 1 is a cross-sectional perspective view of a portion of an embodiment of a stator in accordance with this disclosure.
Figure 2:
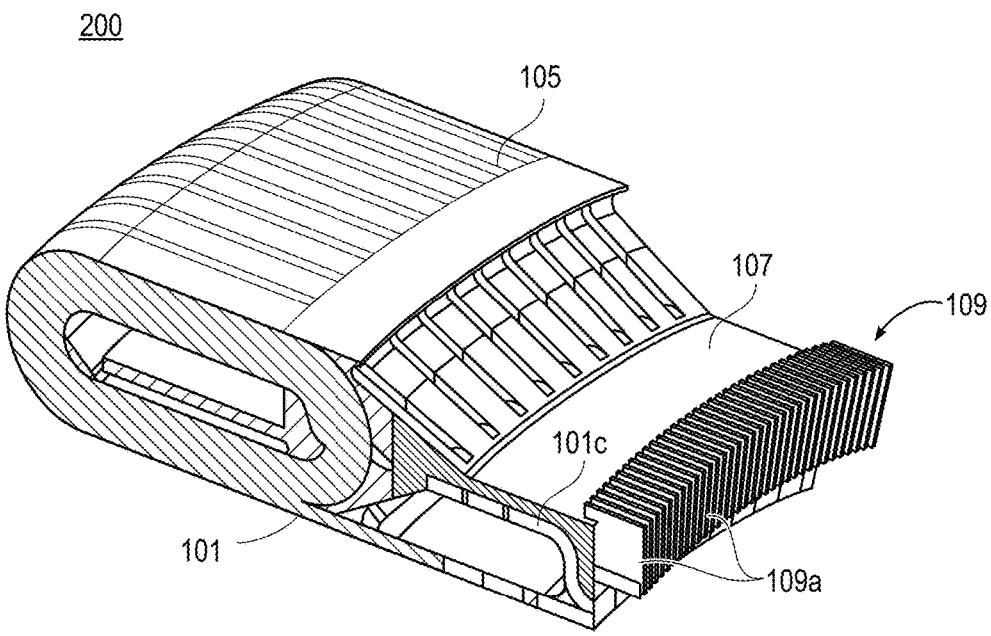
FIG. 2 is a cross-sectional perspective view of a portion of an embodiment of a stator in accordance with this disclosure, shown having cooling fins.
Figure 3:
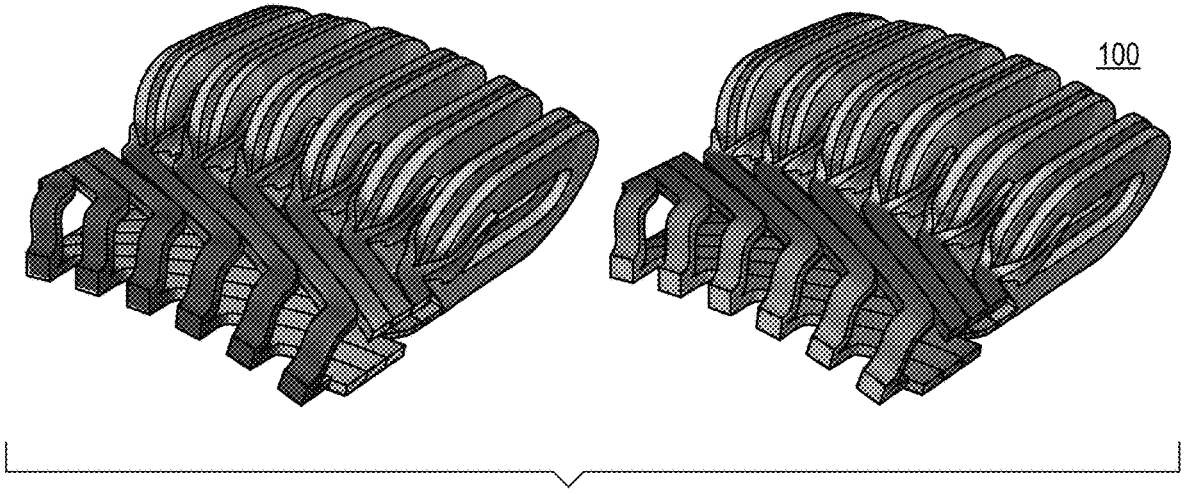
FIG. 3 is a comparison temperature profile of traditional stator vs. the embodiment of FIG. 1, showing significant cooling performance in the embodiment of FIG. 1.

Reference will now be made to the drawings wherein like reference numerals identify similar structural features or aspects of the subject disclosure. For purposes of explanation and illustration, and not limitation, an illustrative view of an embodiment of a stator in accordance with the disclosure is shown in FIG. 1 and is designated generally by reference character 100. Other embodiments and/or aspects of this disclosure are shown in FIGS. 2-3.

A stator 100 for an electrical machine (e.g., a motor/generator) can include a plurality of windings 101, each forming a coil 101a and end connections 101b, 101c. The stator 100 can include a first potting material 105 having a first viscosity and a first thermal conductivity. The first potting material 105 can be disposed on each coil 101a and fills gaps between each coil 101a, for example.

The stator 100 can include a second potting material 107 different from the first potting material 105 and having a second viscosity and a second thermal conductivity. The second viscosity can be higher than the first viscosity and the second thermal conductivity is higher than the first thermal conductivity. The second potting material 107 can be disposed on each of the end connections 101b, 101c to provide increased thermal conductivity from the end connections 101b, 101c.

In certain embodiments, the first potting material 105 can be low viscosity epoxy. The second potting material 107 can include epoxy and one or more of higher thermal conductivity particles or fibers. In certain embodiments, the higher thermal conductivity particles or fibers include glass. In certain embodiments, the higher thermal conductivity particles or fibers can include carbon. In certain embodiments, the higher thermal conductivity particles or fibers can include boron nitride (BN) or hexagonal-BN, for example. Any suitable higher thermal conductivity material for the second potting material 107 is contemplated herein (e.g., of any suitable viscosity, such as the same as or higher than that of the first potting material 105).

In certain embodiments, referring to FIG. 2, the stator 200 can include one or more cooling features 109 formed by or embedded in the second potting material 107 configured to remove heat from the second potting material 107 and/or the end connections 101b, 101c. As shown, in certain embodiments, the one or more cooling features 109 can include a plurality of fins 109a extending outwardly from the second potting material 107 (e.g., proximal to and/or extending from the end connections 101c). For example, the plurality of fins 109a can be formed circumferentially, e.g., as shown, with a gap between each fin 109a. The fins 109a can allow fluid flow to draw heat from the fins 109a to pull heat more efficiently from the end connections 101b, 101c, for example. The cooling features 109 can include one or more of fins 109a, ridges, grooves, or any other suitable structure for enhanced thermal conductivity. The cooling features can be applied in any suitable location, e.g., on the surface of the second potting material 107, for example. The cooling features 109 can be molded, additively manufactured, or subtractively manufactured in any suitable manner.

In certain embodiments, more than two potting materials can be used. For example, certain embodiments can include three or four potting materials depending on location and grading to achieve a desired thermal effect. Any suitable mixture of potting materials and/or types (of suitable viscosity and conductivity) are contemplated herein.

In accordance with at least one aspect of this disclosure, a structure can include a first portion including first gaps, a second portion having no gaps or second gaps larger than the first gaps, a first potting material 105 (e.g., as disclosed herein, e.g., as described above) having a first viscosity and a first thermal conductivity. The first potting material 105 can be disposed on the first portion and can fill the first gaps of the first portion. The structure can include a second potting material 107 (e.g., as disclosed herein, e.g., as described above) different from the first potting material 105 and having a second viscosity and a second thermal conductivity. The second viscosity can be higher than the first viscosity and the second thermal conductivity is higher than the first thermal conductivity. The second potting material 107 can be disposed on the second portion to provide increased thermal conductivity to the second portion. In certain embodiments, the structure can be a stator 100, e.g., as disclosed herein, e.g., as described above. Other suitable structures are contemplated herein. The structure can include any other suitable features similar to the stator 100, 200 as disclosed herein, e.g., as described above.

In accordance with at least one aspect of this disclosure, a method can include applying a first potting material 105 (e.g., as disclosed herein, e.g., as described above) having a first viscosity and a first thermal conductivity. The first potting material 105 can be disposed on the first portion and fills the first gaps of the first portion to windings 101 of a stator 100 to fill in gaps between coils 101. The method can also include applying a second potting material 107 (e.g., as disclosed herein, e.g., as described above) to end connections 101b, 101c of the windings 101. The second potting material 107 can be different from the first potting material 105 and has a second viscosity and a second thermal conductivity. The second viscosity can be higher than the first viscosity and the second thermal conductivity is higher than the first thermal conductivity. The second potting material 107 can be disposed on the second portion to provide increased thermal conductivity to the second portion.

Applying the first potting material 105 can be performed before applying the second potting material 107. The method can further include bonding the first potting material 105 and the second potting material 107 together. The method can include providing a transition between the first potting material 105 and the second potting material 107 to provide bonding between the first potting material 105 and the second potting material 107. For example, the high thermal conductivity material can be layered to mesh with the lower conductivity/viscosity material, or there can otherwise be a gradient of layers to maximize cooling in hot spots, for example.

Embodiments can be applied to any suitable low-space/high-space structure. Certain embodiments can have the thinner material applied first to prevent creating a blockage. Embodiments of am method may have steps ordered based on curing temperatures/pressures so that the materials are soft and can bond together when applied. Embodiments may also include a transition material between the first and second potting materials to aid in bonding disparate chemistries or to prevent coefficient of thermal expansion (CTE) issues. Certain embodiments can also have a final layer of a single material (e.g., second potting material) to add a stiff coating to the structure.

Embodiments can include an ultra-compact multi-part stator potting epoxy. Low-viscosity potting materials generally have low thermal conductivity. Embodiments can include an approach to fill a stator winding with multiple materials to take advantage of both the low viscosity of pure epoxy to fill small gaps and high thermal conductivity of a composite (e.g., thermally enhanced) epoxy to keep end connections cool. In this case, the immediate winding region containing small gaps can be filled with low-viscosity epoxy. The end connections of the wires can be immersed in a higher thermal conductivity material. This may be composite material containing epoxy and higher thermal conductivity particles or fibers such as glass, carbon, etc. It is contemplated that certain embodiments can have multiple materials and/or layers. It is contemplated that certain embodiments can include embedded fins or other cooling features in the potting material. FIG. 3 illustrates the effectiveness of certain embodiments of this disclosure.

Embodiments can provide improved power density electric machines, improved manufacturability, reduced localized hot spots, and increased thermal management with custom potting material choices. Other benefits of certain embodiments are contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A stator for an electrical machine, comprising:
   a plurality of windings, each winding forming a coil and end connections;
   a first potting material having a first viscosity and a first thermal conductivity, wherein the first potting material is disposed on each coil and fills gaps between each coil;
   a second potting material different from the first potting material and having a second viscosity and a second thermal conductivity, wherein the second viscosity is higher than the first viscosity and the second thermal conductivity is higher than the first thermal conductivity, wherein the second potting material is disposed on each of the end connections to provide increased thermal conductivity from the end connections; and
   a transition material between the first and second potting materials, the transition material configured to at least one of: (i) aid in bonding disparate chemistries of the first and second potting materials or (ii) prevent issues involving different coefficients of thermal expansion of the first and second potting materials.

2. The stator of claim 1, wherein the first potting material is pure low-viscosity epoxy.

3. The stator of claim 2, wherein the second potting material is epoxy and one or more of higher thermal conductivity particles or fibers.

4. The stator of claim 3, wherein the higher thermal conductivity particles or fibers include glass.

5. The stator of claim 3, wherein the higher thermal conductivity particles or fibers include carbon.

6. The stator of claim 1, further comprising one or more cooling features formed by or embedded in the second potting material, the one or more cooling features configured to remove heat from the second potting material and/or the end connections.

7. The stator of claim 6, wherein the one or more cooling features include a plurality of fins extending outwardly from the second potting material.

8. The stator of claim 7, wherein the fins are formed circumferentially with a gap between each fin.

9. A structure, comprising:
   a first portion including first gaps;
   a second portion having no gaps or second gaps larger than the first gaps;
   a first potting material having a first viscosity and a first thermal conductivity, wherein the first potting material is disposed on the first portion and fills the first gaps of the first portion;
   a second potting material different from the first potting material and having a second viscosity and a second thermal conductivity, wherein the second viscosity is higher than the first viscosity and the second thermal conductivity is higher than the first thermal conductivity, wherein the second potting material is disposed on the second portion to provide increased thermal conductivity to the second portion; and
   a transition material between the first and second potting materials, the transition material configured to at least one of: (i) aid in bonding disparate chemistries of the first and second potting materials or (ii) prevent issues involving different coefficients of thermal expansion of the first and second potting materials.

10. The structure of claim 9, wherein the first potting material is pure low-viscosity epoxy.

11. The structure of claim 10, wherein the second potting material is epoxy and one or more of higher thermal conductivity particles or fibers.

12. The structure of claim 11, wherein the higher thermal conductivity particles or fibers include glass.

13. The structure of claim 11, wherein the higher thermal conductivity particles or fibers include carbon.

14. The structure of claim 9, further comprising one or more cooling features formed by or embedded in the second potting material, the one or more cooling features configured to remove heat from the second potting material and/or the second portion.

15. The structure of claim 14, wherein the one or more cooling features include a plurality of fins extending outwardly from the second potting material.

16. The structure of claim 15, wherein the fins are formed circumferentially with a gap between each fin.

17. A method, comprising:
   applying a first potting material having a first viscosity and a first thermal conductivity, wherein the first potting material is disposed on windings of a stator to fill in gaps between coils of the stator; and
   applying a second potting material to end connections of the windings, wherein the second potting material is different from the first potting material and has a second viscosity and a second thermal conductivity, wherein the second viscosity is higher than the first viscosity and the second thermal conductivity is higher than the first thermal conductivity, wherein the second potting material is disposed on the end connections to provide increased thermal conductivity to the end connections; and
   wherein a transition material is positioned between the first and second potting materials, the transition material configured to at least one of: (i) aid in bonding disparate chemistries of the first and second potting materials or (ii) prevent issues involving different coefficients of thermal expansion of the first and second potting materials.

18. The method of claim 17, wherein applying the first potting material is performed before applying the second potting material.

19. The method of claim 17, further comprising bonding the first potting material and the second potting material together.

20. The method of claim 17, further comprising applying a final layer of the second potting material over the stator to create a stiff coating for the stator.

* * * * *